June 28, 1960

P. W. TIMM 2,943,160

ELECTRIC CLOCK MOTORIZED SWITCH APPARATUS
FOR OUTLET BOX MOUNTING

Filed Jan. 27, 1958

INVENTOR.
PAUL W. TIMM
BY
Wheeler, Wheeler, & Wheeler
ATTORNEYS

United States Patent Office 2,943,160
Patented June 28, 1960

2,943,160

ELECTRIC CLOCK MOTORIZED SWITCH APPARATUS FOR OUTLET BOX MOUNTING

Paul W. Timm, Manitowoc, Wis., assignor to Paragon Electric Company, Two Rivers, Wis., a corporation of Wisconsin Filed Jan. 27, 1958, Ser. No. 711,368

6 Claims. (Cl. 200—35)

This invention relates to improvements in electric clock motorized switch apparatus for outlet box mounting.

Heretofore the use of the common synchronous electric clock motor for operation of electric switching mechanism to be installed in, or in connection with, the common domestic type of outlet box has been limited in a number of respects due to the fact that a synchronous motor in the common outlet box made of sheet iron or other magnetically responsive material is so weakened by losses magnetically that little if any power is available for actual operation of gear trains or other movable parts. As a result of this invention, a closure "plate" for the standard sheet iron outlet box has been so shaped, and the arrangement of parts of the switch and switch operating mechanism has been so devised that within the limits of a reasonable shape and size of outlet box cover plate or closure, the synchronous motor parts of the switch and switch operating mechanism are so disposed as to maintain the efficiency of the motor and assure reliable operation and aesthetic appearance of the complete assembly.

The particular typical assembly and embodiment of the invention as used in the following disclosure is one in which a standard electric switch outlet box of the type used in homes is used in conjunction with a switch and switch mechanism operated by a synchronous motor as may be adapted to the function of turning on or energizing a fan or other electric accessory for a timed interval of operation to be terminated by the opening of the switch and the de-energization not only of the control accessory, but also of the clock motor itself.

In the drawings:

Fig. 1 is a front elevation showing the closure plate for an electric outlet box according to this invention, a portion of the dial being broken away to show the means for securing the dial to an outlet box.

Fig. 2 is a section on line 2—2 of Fig. 1 showing in vertical section the complete assembly of the closure plate outlet box and outlet box contents with their electrical connections.

Fig. 3 is a section on line 3—3 of Fig. 2 showing a portion of the gear train operated by the synchronous motor of the switch to be controlled thereby.

Fig. 4 is a section on line 4—4 of Fig. 2 showing the relative position of some of the principal parts of the assembly respecting the electric outlet box.

As indicated above, the common electrical equipment for domestic purposes includes a metal, usually iron, box 10 standardized in oblong form as shown in the drawings. The box is provided with adjustably mounted brackets 11 secured to the upper and lower walls 12 and 13 respectively of the box; these brackets being positioned to abut the inside of a lath 14 and plaster 15 wall so that the outer margins 16 of the walls of the box 10 are approximately aligned with the surface 17 of the wall of the room. At the upper and lower ends of the box, the material of the box is outturned to provide attaching tabs 18 and 19 bored and tapped for screws as shown to hold closure plate 20, which is one of the principal structural parts involved in this invention. The screws received in the tabs 18 and 19 are shown at 21 and 22 respectively.

In this description, the wide open arrangement of the box margins will be termed the "portal" of the box 10.

Illustrative of electrical connections to be controlled by the switch and mechanism described below, the drawings disclose the usual BX cable 25 with two electrical leads 26 and 27 to signify generally the supply source of electrical current, and at 28 a cable with electrical leads 29 and 30 are arranged for connection to a load such as an electric fan, electric light, or electric motor, to name a few of the types of controlled devices.

The mechanism described below for operation of the electric switch to control the load and clock circuit and including a synchronous motor would normally be housed in the box 10, and it might be expected that an arrangement of parts would dispose the electric motor in a position very deeply in the box 10 so that the operating mechanism such as gear train and switch would be in the portion of the box accessible through the portal of box 10. However, as indicated above, an electric motor having a core and field windings located in a box 10 of iron or other magnetically responsive material located in close association with such a core will dissipate sufficient of the magnetic flux so as to weaken a motor and provide problems which have heretofore dictated that such small motors be located completely outside of a box such as box 10. According to this invention as shown most clearly in Figs. 2, 3 and 4, the electric motor indicated generally at 35 has a laminated core 36 of somewhat planiform configuration provided with a coil 37 so arranged with respect to the armature shaft equipped with driving sprocket 38 that the core is located outside of the portal of the box 10. This means that the core 36 is in a position to be housed within the concave portion of portal closing plate 20.

In the particular construction of plate 20, certain ribs shown in the drawings at 39, 40, 41, 42, 43 and 44 are provided for functional reasons related to the molding of a plastic product; it being of importance in connection with this invention that the closure plate 20 be made of non-magnetically responsive material. The other contours of the plate 20 are dictated by aesthetic considerations, but it will be understood that the generally concave portions of the plate 20 related to the housing of the core 36 and portions of the coil 37 outside the portal of box 10 are important to this invention.

The magnetically important portions of the motor being housed in the concave portions of the plate 20 outside of the portal of the box 10, it is now feasible to provide a frame 45 within the box 10 to house and support a train of gears connected gearwise with pinion 38 on the armature shaft of the motor as shown clearly in Figs. 2 and 3. The pinion 38 is connected, through a gear train, with switch operating cam 46 which is a simple electrically insulative fiber wheel provided with a circular peripheral cam surface but including a cam depression or groove 47. Against this peripheral contour a movable switch blade 48 is provided with a cam riding portion 49 shaped to drop into the groove 47, and since, as in the illustrated gear connections, cam wheel 46 revolves once in seventy minutes, the movable switch blade with its contact point 50 is in electric contact with fixed contact point 51 at all times except when the cam following portion of the switch blade 48 drops into the groove 47.

The final gear in the train of gears powered by driving pinion 38 is shown at 52, and it comprises an idler upon a dial shaft 53 which is keyed to a hub 54 upon which the cam wheel 46 is mounted. The only connection of the gear train with the cam wheel 46 is provided in a friction spring washer 55, the fingers of which bear upon gear 52 in a manner quite common in the provision of friction drives in horological instruments.

Keyed to dial shaft 53 is a setting knob 60 provided with a pointer at 61 which, with the knob, is normally driven to rotate over the calibrated dial 62 whenever the contact points are together and the movable blade 48 of the switch is riding on the peripheral ungrooved portion of cam 46.

The frame 45 not only carries the gear train and the motor, but also includes positioning posts such as 65 (of which there is a counterpart, not shown, on the other side of the plate) at the uppermost portion and attaching bosses 67 at intermediate points along the sides of the frame, plus a bracing boss 68 at the lowermost portion of the frame (see Fig. 2). These various parts 65, 67 and 68 are positioned to be juxtaposed to posts such as 69 and 70 forming parts of the plate 20. A pair of screws 71 and 72 extend through the core and into attaching bosses 67. Between the core 36 and the attaching bosses 67 there are clips 73 (and a counterpart thereof, not shown, on the other side of the core) which are of sufficient length to extend upwardly to a pair of suspending posts 75 forming part of plate 20. These suspending posts are tubular so that screws 77 and 78, extending through from the front of the plate 20, are respectively receivable in threaded relation to the clips. The dimensions of the posts and bosses are such that when the screws 77 and 78 are pulled up snugly, the posts and bosses are in abutment, thus determining the position of the parts as shown especially in Fig. 2. As an assembly technique, a clip 79 of relatively soft metal is held as a washer under the head of each screw 77 or 78 and has a clip extension receivable through an aperture in dial plate 62 to retain the dial in position.

Electrically, lead 27 is a grounding or neutral lead. It connects not only to a lead 80 connected to one terminal of coil 37, but also connects to lead 29 to one terminal of the load. Lead 26 from the source of current connects through lead 81 to fixed point 51 of the switch assembly as shown in Fig. 3. When the points 50 and 51 are closed by cam action, the electrical circuit is completed through the movable switch blade 48 not only to lead 82 to a terminal of the coil 37 but also through lead 83 to lead 30 connected to the other terminal of the load.

It will be obvious from this description that when the points 50 and 51 are open, coil 37 is de-energized and the circuit through the load is open. This condition prevails when the cam riding portion 49 of the movable switch blade 48 is in cam groove 47. In this position of the parts, the setting knob 60, keyed to shaft 53, has its pointer 61 pointed to the calibration marked zero on the dial 62. The user of this device may then rotate the setting knob 60 in either direction to a position in which it points to one of the other calibrations on the dial; for instance, he may point the pointer 61 to the calibration marked 60. The points 50 and 51 are closed immediately when the cam riding portion 49 of the movable switch blade 48 leaves groove 47 and the clock motor, which is self-starting to always rotate the setting knob in a clockwise direction as shown in Fig. 1, will commence operation of the gear train in frame 45 so as to frictionally drive the cam 46 at a rate determined by the particular gear train used. In the specific instance described above, the setting knob 60 will rotate clockwise with shaft 53 and with cam 46 in sixty minutes to bring the pointer to the zero mark which determines that the cam riding portion 49 will again drop into groove 47 to open the clock operating and load circuits. If the pointer is moved manually to one of the other calibrations on the dial, the amount of time required to bring the cam groove into switch opening position will correspond to the marked number of minutes as shown on the calibrated dial.

I claim:

1. The combination with an outlet box made of magnetically responsive material adapted to be stationarily mounted in a wall recess and having a portal through which box contents are received, apparatus removably positioned in the box and comprising a synchronous clock motor having a core, field coil, armature, and driving unit to connect the armature to a driven mechanism, a concave non-magnetically responsive closure member receivable in cover relationship to the portal of such box in position to house the said core in the concave portion of the closure member outside the box, and a driven mechanism including a switch connected to the driving unit and positioned to be housed within the box.

2. The combination of claim 1 including a frame, the driven mechanism and the clock are carried by the frame, and said frame is secured to the closure member.

3. The combination of a magnetically responsive outlet box adapted to be stationarily mounted in a wall recess and having a portal through which box contents are received, a non-magnetically-responsive member shaped to bridge over the margins of the portal of the outlet box, means removably connecting the member to said box with the member spaced outwardly of the portal, an electric motor having a core in planiform shape mounted to said member to position the core within the space between the box and the said bridge portion, and means driven by said motor carried by said member within the outlet box.

4. The claimed subject matter of claim 3 wherein the means driven by said motor includes a clip between the core and said member.

5. The combination of a mounting plate and an electric outlet box, said plate having a concave portion to receive a portion of box contents protruding from said box, the concave portion of the plate being provided with mounting posts shaped to abut mechanism secured to the plate, mechanism comprising box receivable contents including post abutting and attaching means to position said mechanism relative to the plate, said plate having means for removably attaching it to said electric outlet box in position to dispose part of the mechanism in the box.

6. The device of claim 5 wherein the mechanism includes a frame having switch means and a gear train for operation of the switch comprising box receivable contents, and a motorized clock having a core positioned between the mechanism and the plate in the concave portion.

References Cited in the file of this patent

UNITED STATES PATENTS

| | | |
|---|---|---|
| 2,013,208 | Hammond | Sept. 3, 1935 |
| 2,685,625 | Holstein | Aug. 3, 1954 |
| 2,752,517 | Von Delden | June 26, 1956 |
| 2,813,161 | Tuttle | Nov. 12, 1957 |